United States Patent [19]

Cocito

[11] 4,202,679
[45] May 13, 1980

[54] PROCESS AND APPARATUS FOR THE CONTINUOUS PRODUCTION OF ELONGATE LIGHT CONDUCTORS

[75] Inventor: Giuseppe Cocito, San Giusto Cans-se, Italy

[73] Assignee: CSELT - Centro Studi e Laboratori Telecomunicazioni S.p.A., Turin, Italy

[21] Appl. No.: 962,186

[22] Filed: Nov. 20, 1978

[30] Foreign Application Priority Data

Nov. 25, 1977 [IT] Italy ............................ 69655 A/77

[51] Int. Cl.² ............................................ C03B 37/02
[52] U.S. Cl. ............................................ 65/2; 65/3 A; 65/13; 219/123; 219/426
[58] Field of Search ................ 219/426, 123; 65/2, 65/13, 3 A

[56] References Cited

U.S. PATENT DOCUMENTS

| | | | |
|---|---|---|---|
| 3,177,057 | 4/1965 | Potter et al. | 65/13 |
| 3,409,728 | 11/1968 | Jaques | 219/427 X |
| 4,017,288 | 4/1977 | French et al. | 65/3 A X |

FOREIGN PATENT DOCUMENTS

| | | | |
|---|---|---|---|
| 2605483 | 8/1977 | Fed. Rep. of Germany | 65/3 A |
| 51-71313 | 6/1976 | Japan | 65/3 A |
| 725656 | 3/1955 | United Kingdom | 65/13 |

*Primary Examiner*—Robert L. Lindsay, Jr.
*Attorney, Agent, or Firm*—Karl F. Ross

[57] ABSTRACT

An elongate light conductor of circular or other cross-section is continuously produced by depositing, in a vacuum chamber, a powdered glassy (i.e. vitreous or vitrifiable) material upon the upper end of a descending rod of like material while training a stream of doping ions upon the same end. Vitrification may be assisted by an electron beam, also trained upon the powder-receiving rod end, and/or by thermal treatment of the rod leaving the vacuum chamber. The lower end of the rod is softened in a furnace from which a vitreous strand of reduced cross-section is continuously drawn through an orifice and wound upon a mandrel.

12 Claims, 1 Drawing Figure

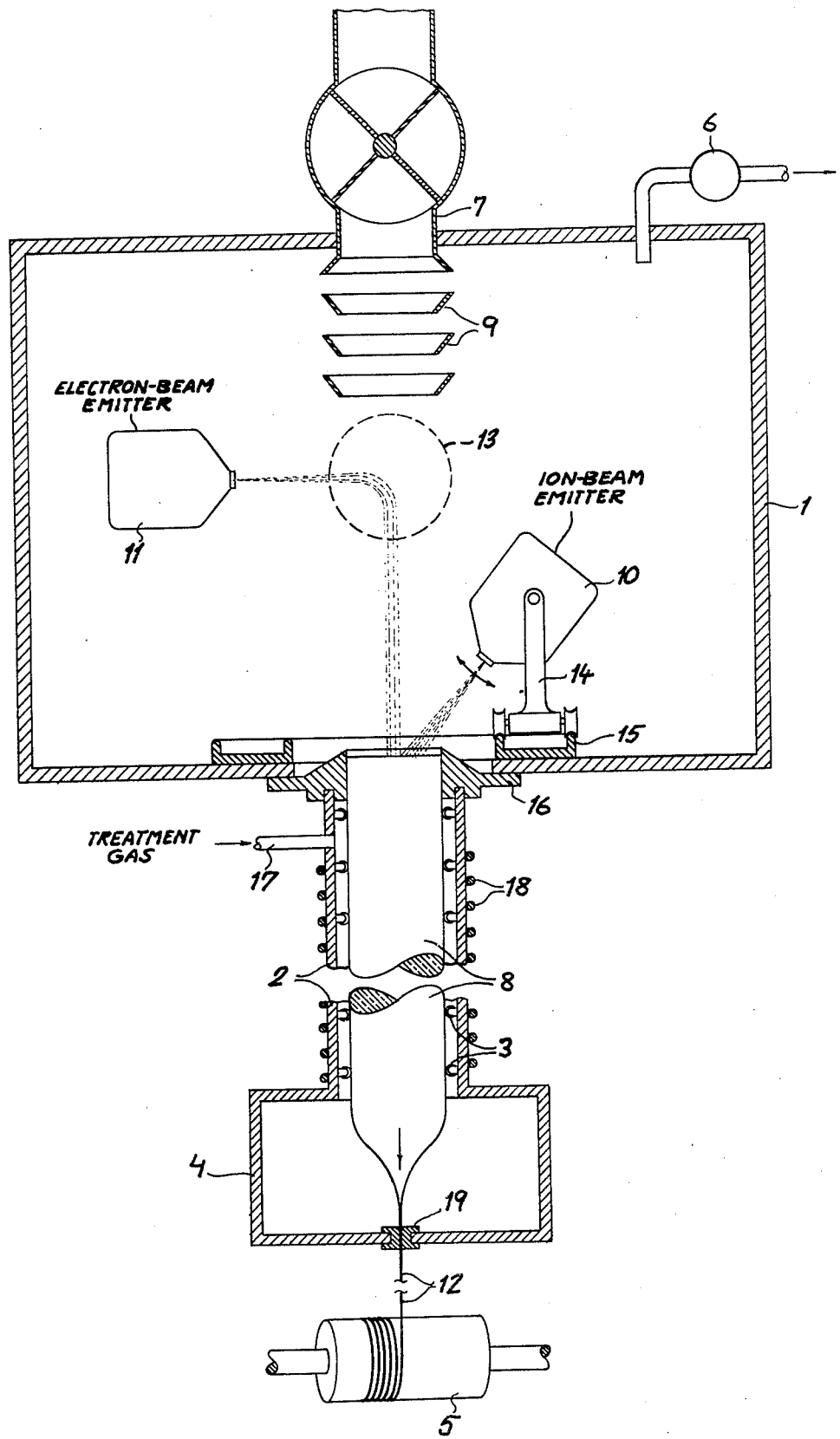

PROCESS AND APPARATUS FOR THE CONTINUOUS PRODUCTION OF ELONGATE LIGHT CONDUCTORS

FIELD OF THE INVENTION

My present invention relates to a process and an apparatus for continuously producing elongate light conductors of predetermined refractivity.

BACKGROUND OF THE INVENTION

Recent advances in the transmission of luminous signals through light-conducting fibers or ribbons have made their use attractive for telecommunication purposes. Thus, signal paths constituted by such light conductors can have lengths on the order of tens of kilometers between repeaters, thanks to their low attenuation constants.

Since such light conductors are usually produced only in sections of limited length, long-distance transmission lines often must be spliced together from a large number of such sections. The splicing of the fibers or ribbons is a delicate and therefore time-consuming operation; aside from the cost involved, every splice also entails a loss of energy due to unavoidable differences in the diameters of the conductor cores and/or their sheaths as well as in the optical characteristics of the vitreous core material.

Some methods, such as the double-crucible technique or the Verneuil process, have already been proposed for the continuous manufacture of optical-fiber trunks designed to obviate the need for splices between repeater stations. These prior methods, however, have limited applicability especially in cases in which the refractive index of the fiber is to vary according to a predetermined law. Thus, conventional procedures allow this index to be modified only in a discontinuous manner. There is also the problem of avoiding contamination of the core material.

OBJECTS OF THE INVENTION

An important object of my present invention, therefore, is to provide an improved process for the continuous production of such light conductors, particularly with a refractive index varying gradually rather than in steps in radial and/or axial direction.

A related object is to provide an apparatus for the efficient performance of the process, with avoidance of contamination of the product.

SUMMARY OF THE INVENTION

In carrying out the process according to my invention, I place a vitreous seed rod in a vertical position with an exposed upper end on which I deposit successive amounts of a glassy material together with ions of a refractivity-controlling doping substance, suitably dosed to establish a desired refractive index. The term "glassy material", as here used, encompasses both vitreous substances and those in a vitrescent state. The glassy deposit with the accompanying doping substance is fused onto the rod, preferably with the aid of an electron beam trained upon the deposition site, whereby the rod is progressively extended upwardly. To compensate for this upward extension, I progressively lower the rod at an average speed corresponding to its growth rate. The lower end of the descending rod, after sufficient thermal softening, is drawn into a vitreous strand of reduced cross-section, i.e. a filament or a flat ribbon.

The drawing of the softened lower rod end into a reduced-section strand may be carried out by way of an orifice or die of desired cross-sectional width and shape, with the aid of a continuously rotating mandrel or capstan on which the filament is wound. The tractive force thus exerted upon the vitreous rod should be supplemented by that of transport means such as rollers or conveyor chains frictionally engaging the solid upper part of the rod, especially when that rod acts as a plug in an outlet of a vacuum chamber in which the deposition of doping ions and the electronic heating take place. Since the seed rod used at the start of the operation will generally differ in its composition from the controlledly doped glassy material subsequently deposited, the first portion of the filament or ribbon drawn from that seed rod ought to be cut off and either discarded or remelted into a new seed rod. If desired, the product thus obtained may be coated with an outer layer of dissimilar material as is well known in the art.

The controlled deposition of the doping substance, consistent with the refractive index to be imparted to the product, may be achieved by means of an ion emitter which preferably is rotatable about the vertical rod axis for uniformity of distribution. Changes in the refractive index over all or part of the length of the strand can be brought about by simply varying the energization of the ion emitter. Variations in the ion density in the rod as a function of radius, brought about by a suitable positioning of the inclined ion stream, are preserved in the resulting strand which therefore can have a selected refractivity profile. Examples of usable doping substances are phosphorus, germanium and fluorine.

If the deposited glassy material is in a vitrescent state, it can be thermally vitrified after leaving the vacuum chamber. This vitrification may take place on the way to a furnace serving for the softening of the lower rod end, or possibly within the furnace itself. In either case, the glassy material grown onto the original rod may be subjected to the action of a treatment gas before complete vitrification, e.g. hydrogen for the reduction of hydroxyls due to atmospheric vapor or oxygen for the oxidation of metallic impurities.

BRIEF DESCRIPTION OF THE DRAWING

My invention will now be described in greater detail with reference to the accompanying drawing the sole FIGURE of which schematically shows an apparatus for the production of light-transmissive fibers of indefinite length.

SPECIFIC DESCRIPTION

The apparatus shown in the drawing comprises a treatment chamber 1 equipped with a vacuum pump 6 and provided at its top with a hopper 7 in line with the upper end of a vitreous rod 8, initially of seed stock, which is frictionally retained in a seat 16 on the bottom of the chamber. Comminuted glassy material, e.g. pure synthetic silica or a low-melting glass, is continuously deposited on the upper rod end through the hopper 7 by way of downwardly converging annular baffles 9. An ion-beam emitter 10 of conventional construction, comprising a target subjected to electronic bombardment, is trained upon the upper rod end for implantation of a doping substance into the pile of glassy powder deposited thereon. To melt this pile, an electron gun 11 emits a beam which is deflected downwardly by the field of an external magnet 13 transverse to the axis of rod 8. The ion-beam generator 10 is swivelably mounted on a carriage 14 traveling over a circular track 15 within chamber 1, the track being centered on the rod axis; with suitable adjustment of the inclination of the ion beam by nonillustrated control means, coupled with the orbiting of the beam emitter around the rod on the track 15, a desired rate of implantation can be maintained substantially uniformly throughtout the cross-section of the growing rod.

A guide tube 2 extends downwardly from seat 16 and is provided with transport rollers 3 for continuously advancing the upwardly growing rod in a downward direction toward a furnace 4 provided with an exit orifice 19. A rotating mandrel 5 winds up a filament 12 continuously drawn from the softened lower rod end.

A treatment gas can be admitted through an inlet 17 into the space between tube 2 and rod 8, ahead of the point where vitrification of the electronically fused powder is completed with the aid of a heating coil 18. The feed rate of the glassy powder is correlated with the operating speeds of transport rollers 3 and drawing mandrel 5 to maintain the top of the rod substantially at the illustrated level within chamber 1.

The rate of supply of doping substance by ion emitter 10 can be varied by controlling its energization, via nonillustrated circuits, to change the refractivity profile of the fiber 12. With suitable shaping of the ion beam generated by emitter 10 (shown to be trained only upon a limited area of the upper rod face) and adjustment of the angle of inclination of that beam relative to the rod axis, therefore, I may provide the fiber (or an analogously produced ribbon) with a refractive index varying, for example, according to a parabolic law as disclosed in commonly owned application Ser. No. 793,420, filed May 3, 1977 by Pietro di Vita, now U.S. Pat. No. 4,134,639.

Furnaces suitable for the softening of the lower rod end are described, for instance, in U.S. Pat. Nos. 1,048,144 and 3,409,728.

I claim:

1. A process for producing an elongate light conductor of indefinite length, comprising the steps of:
   (a) placing a vitreous seed rod in a vertical position with an exposed upper end extending into a vaccum chamber;
   (b) depositing successive amounts of a powdered glassy material in said vacuum chamber on the upper end of said rod while training a beam of ions of a refractivity-controlling doping substance, to be implanted in said glassy material, upon a limited area of said upper end;
   (c) fusing the deposited material with said doping substance onto said rod, thereby progressively extending same upwardly;
   (d) progressively lowering the upwardly growing rod at an average speed corresponding to its growth rate;
   (e) thermally softening the lower end of the descending rod sufficiently to enable its mechanical deformation;
   (f) drawing the softened lower end of said rod into a vitreous strand of reduced cross-section; and
   (g) continuously varying the relative position of said beam of ions and said upper end to distribute said substance in a predetermined pattern over the cross-section of said strand.

2. A process as defined in claim 1 wherein said glassy material is deposited substantially vertically upon said upper end, said beam of ions being inclined at an acute angle to the vertical.

3. A process as defined in claim 1, comprising the further step of training an electron beam upon the upper end of said rod jointly with said beam of ions.

4. A process as defined in claim 1 wherein the glassy material deposited in step (b) is in a vitrescent state and is thermally vitrified after leaving the vacuum chamber.

5. A process as defined in claim 4 wherein the deposited glassy material is subjected to a treatment gas before complete vitrification.

6. A process as defined in claim 1 wherein said beam of ions is rotated within said vacuum chamber about the axis of said rod in step (g).

7. An apparatus for producing an elongate light conductor of indefinite length, comprising:
   a vacuum chamber;
   a holder at the bottom of said vacuum chamber for fricionally retaining a vitreous rod in vertical position;
   stationary hopper means above said holder at the top of said vacuum chamber for depositing successive amounts of a powdered glassy material on the upper end of the rod positioned in said holder;
   an emitter of an ion beam of a refractivity-controlling doping substance, to be implanted in said glassy material, trained in said vacuum chamber upon a limited area of the upper end of said rod;
   heating means for fusing the deposited material with said doping substance onto said rod, thereby progressively extending same upwardly;
   transport means below said holder for progressively lowering the upwardly growing rod at an average speed corresponding to its growth rate;
   a furnace disposed in the path of the descending rod for sufficiently softening its lower end to enable a mechanical deformation thereof;
   drawing means for extracting said lower end from said furnace as a vitreous strand of reduced cross-section; and
   mechanism for displacing said emitter relatively to said holder with resulting distribution of said substance in a predetermined pattern over the cross-section of said strand.

8. A process as defined in claim 1 wherein the intensity of said beam of ions is changed during variation of said relative position in step (g).

9. An apparatus as defined in claim 7 wherein said emitter is mounted in said chamber for rotation about said holder by said mechanism.

10. An apparatus as defined in claim 7 wherein said heating means includes an electron gun in said chamber trained upon the upper end of said rod.

11. An apparatus as defined in claim 7 wherein said heating means is at least partly disposed in a vitrification zone between said chamber and said furnace.

12. An apparatus as defined in claim 11, further comprising an enclosure along the path of said rod between said chamber and said vitrification zone for subjecting said rod to the action of a treatment gas.

* * * * *